(12) United States Patent
Luzzatti et al.

(10) Patent No.: US 8,375,129 B2
(45) Date of Patent: Feb. 12, 2013

(54) METHOD FOR DYNAMICALLY ADJUSTING RESOURCE NODES IN A PEER-TO-PEER NETWORK FOR DELIVERING TIME-SENSITIVE CONTENT

(75) Inventors: Omer Luzzatti, Tel-Aviv (IL); Eran Weiss, Ramat Gan (IL); Shimon Kogan, Kiryat Ono (IL); Jonathan Zion Mozes, Tel Aviv (IL); Jonathan Stern, Tel Aviv (IL)

(73) Assignee: RAY-V Technologies, Ltd., Tel Aviv (IL)

( * ) Notice: Subject to any disclaimer, the term of this patent is extended or adjusted under 35 U.S.C. 154(b) by 220 days.

(21) Appl. No.: 12/871,615

(22) Filed: Aug. 30, 2010

(65) Prior Publication Data

US 2010/0325283 A1    Dec. 23, 2010

Related U.S. Application Data

(63) Continuation-in-part of application No. 12/751,306, filed on Mar. 31, 2010, which is a continuation-in-part of application No. 12/473,006, filed on May 27, 2009, now Pat. No. 8,051,194.

(51) Int. Cl.
*G06F 15/173* (2006.01)

(52) U.S. Cl. ....................... 709/226; 707/622

(58) Field of Classification Search ............. 709/205, 709/226, 227, 229
See application file for complete search history.

(56) References Cited

U.S. PATENT DOCUMENTS

| | | | |
|---|---|---|---|
| 6,484,210 B1 | 11/2002 | Adriano et al. | |
| 6,650,636 B1 | 11/2003 | Bradshaw et al. | |
| 6,665,292 B1 | 12/2003 | Bradshaw et al. | |
| 6,674,731 B1 | 1/2004 | Bradshaw et al. | |
| 6,963,590 B1 | 11/2005 | Mann et al. | |
| 7,174,385 B2 | 2/2007 | Li | |
| 7,194,757 B1 | 3/2007 | Fish et al. | |
| 7,391,767 B2 | 6/2008 | Lee et al. | |
| 7,650,620 B2 | 1/2010 | Fish et al. | |
| 7,664,020 B2 | 2/2010 | Luss | |
| 2002/0161898 A1 | 10/2002 | Hartop et al. | |
| 2003/0158958 A1* | 8/2003 | Chiu | 709/231 |
| 2004/0122741 A1* | 6/2004 | Sidman | 705/26 |
| 2004/0148344 A1* | 7/2004 | Navar et al. | 709/203 |

(Continued)

FOREIGN PATENT DOCUMENTS

WO    2007/110865    10/2007

OTHER PUBLICATIONS

Choi et al., Group-based Dynamic Computational Replication Mechanism in Peer-to-Peer Grid Computing., Cluster Computing and the Grid, 2006. CCGRID 06. Sixth IEEE International Symposium., May 16-19, 2006.*

(Continued)

*Primary Examiner* — Wing F Chan
*Assistant Examiner* — Kostas Katsikis
(74) *Attorney, Agent, or Firm* — Myers Wolin, LLC (57) ABSTRACT

A method for dynamically adjusting resource nodes in a peer-to-peer (P2P) network including allocating an initial number of resource nodes to provide the time-sensitive content to a consumer node, each of the allocated resource nodes provides a portion of the time-sensitive content to the consumer node; checking if there is a need to receive at least an additional portion of the time-sensitive content from at least one reliable node of the P2P network, and if so, receiving the at least additional portion of the time-sensitive content from the at least one reliable node; and requesting an additional number of resource nodes to provide the at least portion of the time-sensitive content when an access to the at least one reliable node occurs more frequently than a first predetermined threshold value, thereby the number of resource nodes allocated to the consumer node is dynamically adjusted.

20 Claims, 4 Drawing Sheets

U.S. PATENT DOCUMENTS

| | | | |
|---|---|---|---|
| 2004/0236863 A1 | 11/2004 | Shen et al. | |
| 2005/0216559 A1* | 9/2005 | Manion et al. | 709/205 |
| 2006/0098588 A1* | 5/2006 | Zhang et al. | 370/255 |
| 2006/0224687 A1 | 10/2006 | Popkin et al. | |
| 2006/0242315 A1 | 10/2006 | Nichols | |
| 2008/0160911 A1 | 7/2008 | Chou et al. | |
| 2008/0222154 A1* | 9/2008 | Harrington et al. | 707/10 |
| 2009/0165068 A1 | 6/2009 | Chang et al. | |
| 2009/0285220 A1* | 11/2009 | Shaffer et al. | 370/395.42 |
| 2010/0293294 A1* | 11/2010 | Hilt et al. | 709/241 |

OTHER PUBLICATIONS

Francisco De Asis Lopez-Fuentes, et al., "Architecture for Media Streaming Delivery over P2P Networks", Institute of Communication Networks, Media Technology Group, Technische Universitat Munchen, Munich, Germany, Lecture Notes in Computer Science: Advanced Distributed Systems, Aug. 31, 2005, pp. 72-82, vol. 3563/2005, Springer, Berlin/Heidelberg, Germany.

Eckehard Steinbach, et al., "Adaptive Playout for Low Latency Video Streaming", Information Systems Laboratory, Department of Electrical Engineering, Stanford University, Proceedings, 2001 International Conference on Image Processing, Oct. 7-10, 2001, pp. 962-965, vol. 1.

Xinyan Zhang, et al., "CoolStreaming/DONet: A Data-Driven Overlay Network for Efficient Live Media Streaming", pp. 1-14, IEEE Infocom '05, Miami, FL., USA, Mar. 2005.

\* cited by examiner

METHOD FOR DYNAMICALLY ADJUSTING RESOURCE NODES IN A PEER-TO-PEER NETWORK FOR DELIVERING TIME-SENSITIVE CONTENT

CROSS-REFERENCE TO RELATED APPLICATIONS

This application is a continuation-in-part (CIP) of U.S. patent application Ser. No. 12/751,306 filed on Mar. 31, 2010, which is a CIP of U.S. application Ser. No. 12/473,006, filed on May 27, 2009, the contents of which are herein incorporated by reference.

TECHNICAL FIELD

The present invention relates generally to video content delivery in a peer-to-peer network, and more specifically to the allocation and de-allocation of resource nodes to a consumer node within the P2P network.

BACKGROUND OF THE INVENTION

The ubiquity of the Internet enables new techniques adaptation to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file while downloading it.

Recently, new systems for real-time streaming over P2P networks have been developed. Examples for such systems may be found in "A Data Driver Overlay Network for Efficient Live Media Streaming" by Zhang, et al. and in "P2P Media Streaming", by Hefeeda, et al., both of which are incorporated herein by reference merely for the useful understanding of the background of the invention. Real-time streaming systems fail to fully utilize the network's resources, as they do not consider the asymmetric nature of the nodes (peers) in a typical Internet protocol (IP) network. Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the bandwidth of the download.

Another type of a real-time P2P network for distributing media can be found in PCT application number PCT/IL2007/000392 entitled "Realtime Media Distribution in a P2P Network", by Omer Luzzatti, et al. (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network, thus to improving the quality of the media consumed by the viewers. Each viewer connects to a plurality of amplifiers in order to receive the overall necessary bandwidth that is capable of providing the full content of a video stream.

It still remains a challenge, and therefore it would be advantageous to provide a solution, to dynamically allocate the necessary number of amplifiers to a viewer to maintain a desired level of quality of service (QoS) while ensuring a well-balanced and well-behaved P2P network.

SUMMARY OF THE INVENTION

Certain embodiments of the invention include a method for dynamically adjusting resource nodes supplying time-sensitive content to a consumer node in a peer-to-peer (P2P) network. The method comprises allocating an initial number of resource nodes to provide the time-sensitive content to the consumer node, each of the allocated resource nodes provides a portion of the time-sensitive content to the consumer node; checking if there is a need to receive at least an additional portion of the time-sensitive content from at least one reliable node of the P2P network, and if so, receiving the at least additional portion of the time-sensitive content from the at least one reliable node; and requesting an additional number of resource nodes to provide the at least portion of the time-sensitive content when an access to the at least one reliable node occurs more frequently than a first predetermined threshold value, thereby the number of resource nodes allocated to the consumer node is dynamically adjusted.

Certain embodiments of the invention also include a peer-to-peer (P2P) network for delivering time-sensitive content. The P2P network comprises a plurality of resource nodes connected to the P2P network for providing at least a portion of the time-sensitive content; at least one reliable node containing the time-sensitive content; at least a consumer node connected to the P2P network that receives portions of the time-sensitive content from two or more of the plurality of resource nodes initially allocated to provide the portions of the time-sensitive content; and a management server for dynamically adjusting the number of resource nodes allocated to the at least consumer node to provide at least one portion of the time-sensitive content.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiment of the invention, in a peer-to-peer (P2P) network, consumer nodes (viewers) receive video streams from one or more resource nodes (amplifiers). Occasionally there is a need to access a reliable node to overcome deficiency in the supply of video streams or equations representative thereof. If such access is above a threshold value, the consumer node may request an additional quota of resource nodes. Reduction in resource nodes happens if, for example, the condition for adding resource nodes is not met and it is identified that there is at least a redundancy over a predetermined threshold of received video streams or equations representative thereof.

Figure 1:
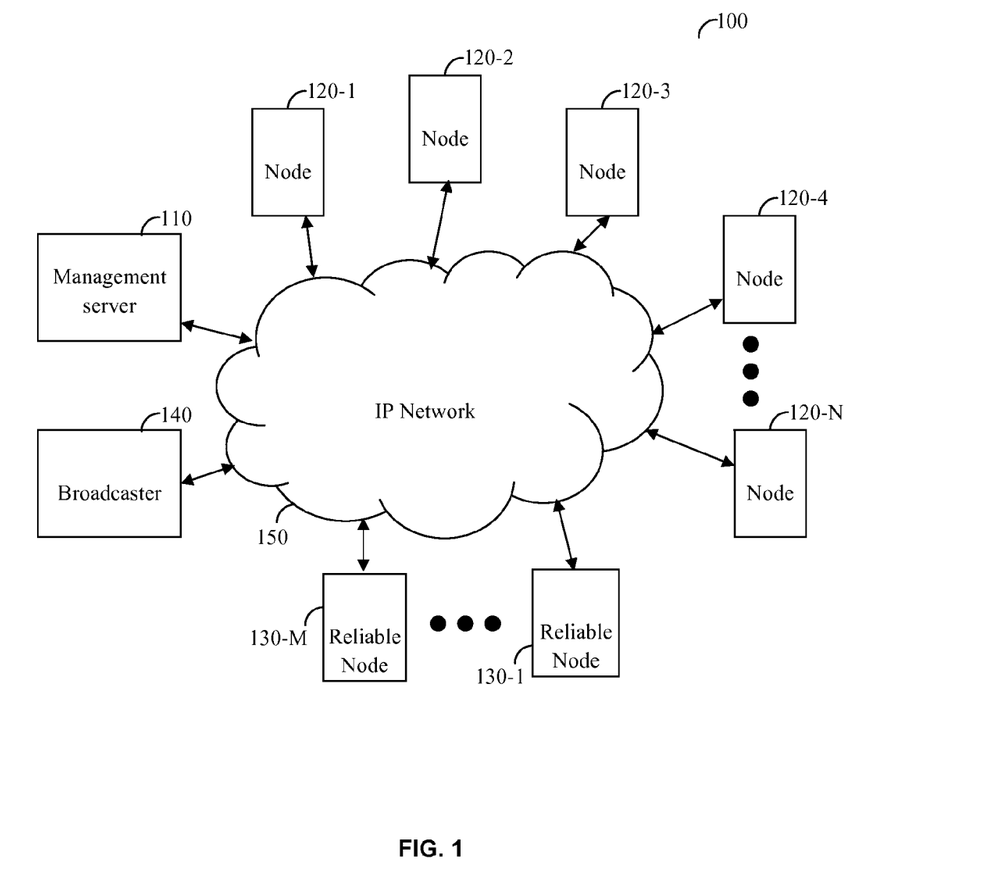
FIG. 1 is a diagram of a P2P network used to describe the principles of the invention.

FIG. 1 shows a non-limiting and exemplary block diagram of a P2P network 100 used to describe the principles of the invention. The P2P network 100 includes a plurality of nodes (peers) 120-1 through 120-N (collectivity referred to as nodes 120), reliable nodes 130-1 through 130-M (collectivity referred to as nodes 130), and a broadcaster 140, all of which communicate with each other over an Internet protocol (IP) network 150. The P2P network 100 further includes a management server 110. The management server 110 may comprise a central processing unit (CPU) coupled to a memory (both are not shown). The memory contains instructions that when executed by the CPU allows for the management of the P2P network 100 in general, and in particular the allocation of at least resource nodes 120 to a broadcast channel in accordance with the principles of the invention discussed herein below in greater detail.

The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time. In an embodiment of the invention, at least two reliable nodes 130 are installed in the P2P network 100. Further, while a single broadcaster 140 is shown in FIG. 1, a plurality of broadcasters may be coupled to IP network 150 without departing from the scope of the invention.

The nodes 120 and reliable nodes 130, distributing the content of a particular channel, constitute a "channel swarm". The nodes 120 may be, but are not limited to, personal computers, servers, smart phones, portable media devices, media control devices, set-up boxes, or any other device capable of exchanging data with other nodes connected to it. A node (120 or 130) may also refer to a module of a software system such as a media player application. Each node 120 can act as a consumer-node and/or a resource-node. Typically, reliable nodes 130 are used only for the purpose of providing content and such nodes receive content from the broadcaster 140. In a typical embodiment of the invention, the reliable nodes 130 are placed at central points of the IP network 150 that are considered to be valuable for the distribution of data. For example, a certain geographical area (also referred to herein as a zone, even though it should be noted that a zone may also be other partitions of nodes), for example, a town may have one or two reliable nodes 130 in general network proximity to the nodes 120 it may serve. A reliable node 130 may be relied to provide a consistent bandwidth and be generally available to the nodes it serves, unlike the other resource nodes, as explained below, which may be available or unavailable, or change bandwidth, over relatively short periods of time.

A consumer node, also referred to as an acceptor or viewer, is a node 120-$c$ (where 'c' is an integer greater than or equal to 1) that belongs to an end-user who wants to watch a channel (i.e., to consume the real-time content). According to an embodiment of the invention, each consumer-node 120-$c$ is constrained to join one or more channel-swarms as determined by the end-user, and must receive a complete, consumable stream of the real-time content. An end-user can view media content broadcasted in a channel on a display connected to the consumer-node. This includes, but is not limited to, a TV screen connected to a set-up box, a monitor connected to a personal computer, a portable multimedia device, and the like. It should be noted that a consumer node may also operate as a resource node, or a donor, to another node 120 of the network 150.

A resource node is a node 120-$r$ (where 'r' is an integer greater than or equal to 1) with an available upload bandwidth that can be contributed to the one or more channel-swarms. In accordance with one embodiment, a resource-node 120-$r$ may be a dedicated network device that shares its bandwidth, but does not consume the media. Such devices are typically installed by service providers, but may also be nodes that are otherwise consumer nodes bit are presently not used for viewing of video streams. A resource-node 120-$r$ may be also an amplifier as described in greater detail in Luzzatti. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

Figure 2:
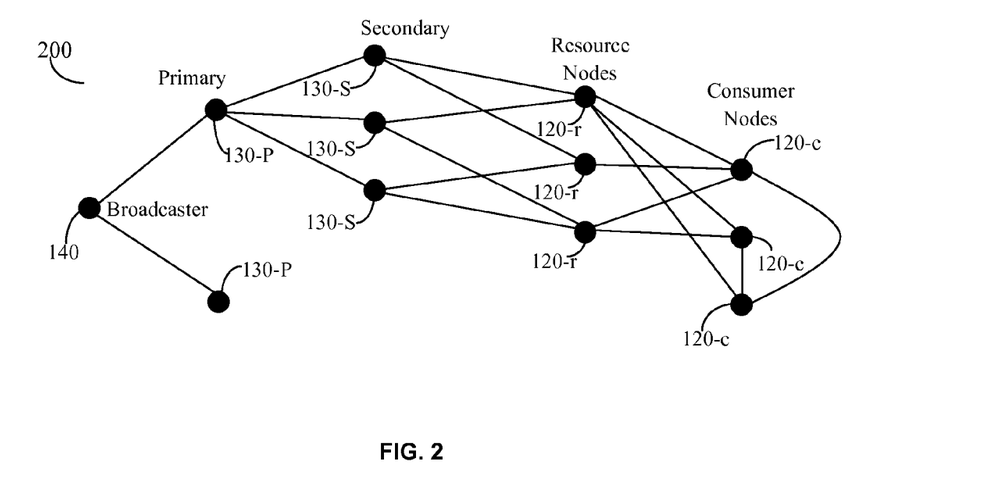
FIG. 2 is a data connectivity diagram describing the connections between the nodes of the P2P network used to deliver video streams.

FIG. 2 provides an exemplary and non-limiting data connectivity diagram 200 describing the connections between the nodes in accordance with the invention. A broadcaster 140 is connected to one or more primary reliable nodes 130-P, each primary reliable node 130-P connected optionally to one or more secondary reliable nodes 130-S. Using this kind of configuration of primary and secondary reliable nodes improves the quality of service (QoS). A consumer-nodes 120-$c$ is connected to other consumer nodes 120-$c$, to resource nodes 120-$r$ (i.e., nodes which are at least not currently used in a viewing mode), and to secondary reliable nodes 130-S, if those exist, or otherwise, directly to primary reliable nodes 130-P. However, as loads change, i.e., there is a different demand for services while a desire to maintain a quality of service, there is a need to dynamically allocate secondary nodes 130. A static view such as shown in FIG. 2 may not suffice.

Figure 3:
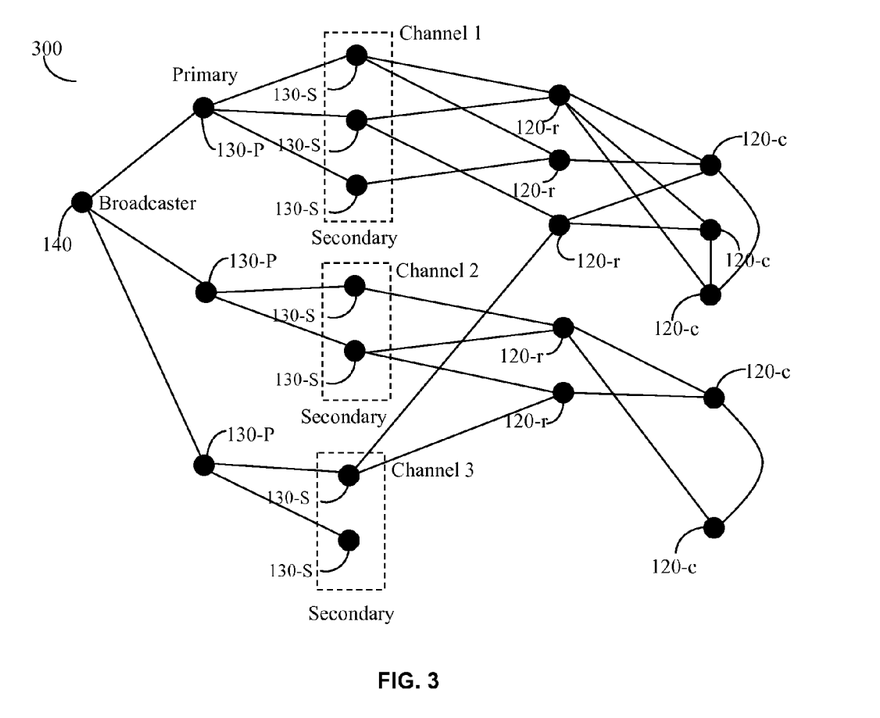
FIG. 3 is an extended data connectivity diagram with channel oriented nodes in accordance with the principles of the invention.

FIG. 3 shows an exemplary and non-limiting diagram 300 of an extended data connectivity with channel oriented secondary nodes provided in accordance with the principles of the invention. The operation of the broadcaster 140 and the primary reliable nodes 130-P has been discussed above. The secondary reliable nodes 130-S are grouped by channels, each channel having its own group of secondary reliable nodes 130-S. The channel nodes of reliable nodes 130 are allocated based on an initial anticipation of usage of such nodes to ensure the desired level of service quality. While channel orientation is shown herein, other grouping may also be used, including but not by way of limitation, geographical grouping or zones. Moreover, a combination of geographic and channel grouping may be used without departing from the scope of the invention. By balancing the use between channel oriented reliable secondary nodes 130-S, it is possible to effectively and automatically manage the quality of service provided by the system to the consumer nodes 120-c.

As can be seen in the exemplary and non-limiting FIG. 3, there are three channels, Channel 1, Channel 2, and Channel 3, each channel serviced by a reliable primary node 130-P and each having several secondary reliable nodes 130-S. In one embodiment, a reliable primary node 130-P may service more than one channel. Typically, the channel oriented secondary reliable nodes 130-S service their respective resource nodes 120-c and consumer nodes 120-c. However, when there is a need for additional bandwidth, reliable nodes 130 (either primary or secondary) from one channel may be used to kick-in and provide additional bandwidth. This may include full release from one channel and transfer into another channel or, allocating a portion of the designated reliable node 130 to provide a certain amount of bandwidth to the channel requiring additional channel bandwidth. The control over the connectivity of the secondary reliable nodes 130-S is performed, for example, by the management server 110.

In the context of a specific P2P network, each consumer node 120-c is responsible for connecting to a plurality of resource nodes 120-r. These resource nodes 120-r provide the consumer node 120-c with portions of the video streams, either in the form of the actual video data, or, as discussed in the co-pending patent application entitled "A System and Method for Real-Time Transfer of Video Content From a Broadcaster Node to a Distribution Node of a P2P Network Over Internet Protocol", filed on the same day as the present application, assigned to common assignee and incorporated herein by reference for all that it contains, in the form of equations that are representative of time sensitive content, e.g., video data. Equations are created by segmenting the content to segments and then to vectors and generating random linear combination equations respective of vectors. A transmitted video stream includes interleaved equations.

A consumer node 120-c, of a P2P network, is instructed to connect to an initial number of resource nodes 120-r, that is expected to provide the consumer node 120-c with a sufficient QoS as defined for the P2P network. According to an embodiment of the invention, the consumer node 120-c makes requests to this initial number of resource nodes 120-r, also referred to as amplifiers, and receives a confirmation from at least part of these consumer nodes 120-r to connect to. It should be appreciated that the management server 11 does not guarantee that the initial number may be achieved by the initial request, or, for that matter, at any time. The consumer node 120-c, once having connected to some resource nodes 120-r, monitors the reception and based thereon decides if it is necessary to request additional resource nodes 120-r or, if it is possible to release one or more resource nodes 120-r, as the case may be. This is described in more detail with respect of FIG. 4 which shows wherein a non-limiting and exemplary flowchart 400 depicts the adding and subtracting of resource nodes as amplifier nodes from which a consumer node receives the video streams according to an embodiment of the invention.

Figure 4:
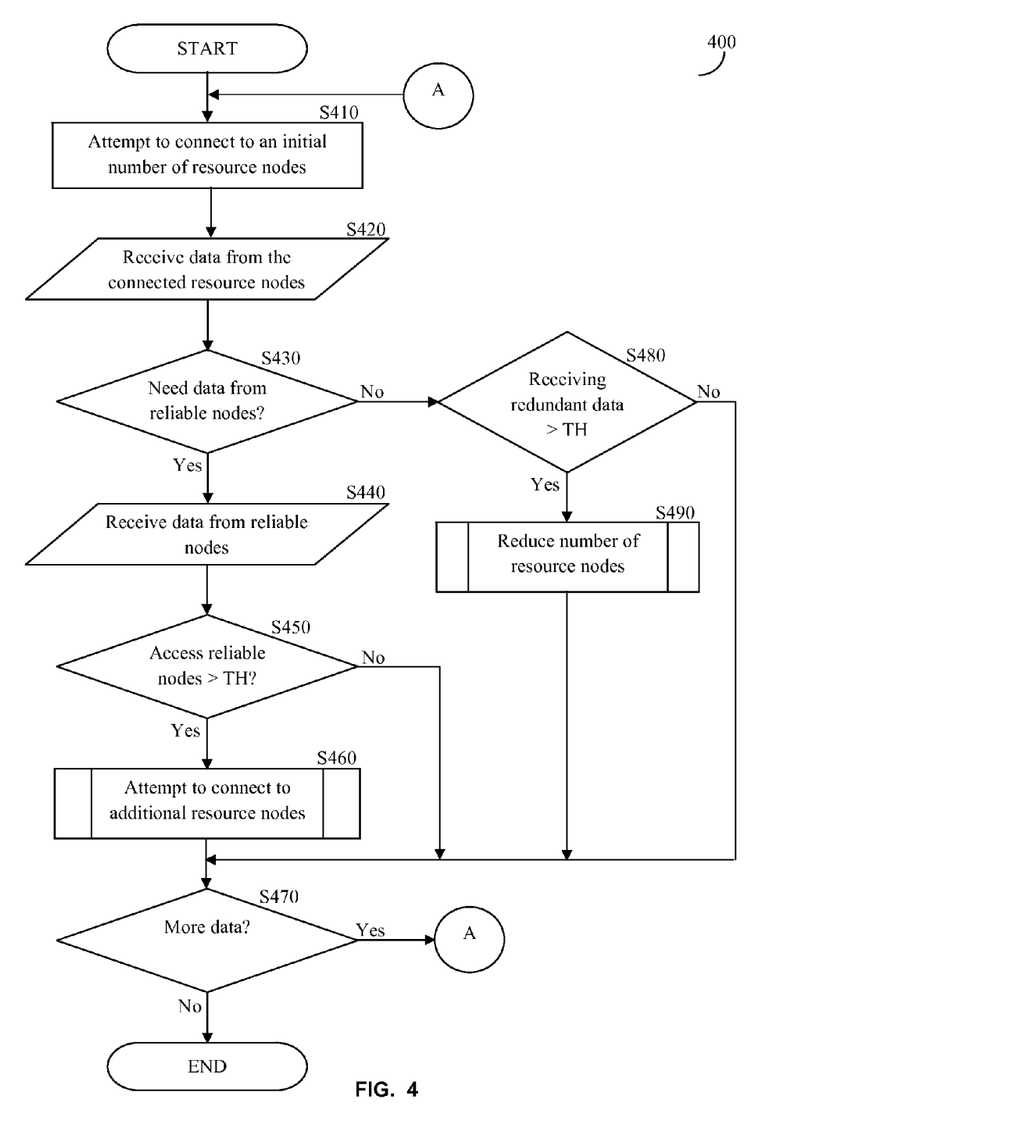
FIG. 4 is a flowchart depicting the adding and subtracting of resource nodes as amplifier nodes from which a consumer node receives the video streams.

In S410, a consumer node, for example consumer node 120-c, attempts to connect to a plurality of resource nodes, for example resource nodes 120-r. The number of resource nodes to initially connect to is provided as an initial number to the consumer node. As noted above it is not guaranteed that all the resource nodes respond favorably to the request to connect. In S420, packets of the video stream related to the P2P network are received by the consumer node. In S430, it is checked if it is necessary for the consumer node to access one or more reliable nodes 130, and if so execution continues with S440; otherwise, execution continues with S480. A need to receive time sensitive content, such as video streams from one or more reliable nodes 130 may happen, for example, when the consumer node determines that the resource nodes are not capable of providing the video streams necessary within the time left to ensure smooth delivery of the video stream for viewing by a user of the consumer node.

In S440, the consumer node receives the necessary video streams from the one or more reliable node 130. In S450, it is checked whether the need to access the one or more reliable nodes 130 occurs in a frequency that is above a predetermined threshold and if so, execution continues with S460; otherwise, execution continues with S470. In S460 an attempt is made to connect to an additional number of resource nodes 120-r in order to overcome the need to access the one or more reliable nodes 130. This is performed in order to ensure that the reliable nodes 130 (primary and/or secondary node) are not unnecessarily loaded if it is possible to meet the need from available resource nodes 120-r not currently allocated to the requesting node.

In one embodiment of the invention, a predefined number of additional resource nodes 120-r is attempted to be connected to. The advantage of this approach is that if a large number of consumer nodes 120-c determine that it is necessary to get additional resource nodes 120-r, the management server is not overwhelmed with requests for additional resource nodes 120-r and allocation takes place gradually. The predefined quota number may be provided by the management server 110. In another embodiment of the invention, a calculation takes place to estimate the number of additional resource nodes 120-r needed to satisfy the QoS conditions for the consumer node 120-c and attempting to connect to that number of additional resource nodes 120-r. The calculation may be performed by either the consumer node 120-c or by the management server 110 responsive to a request from the consumer node, thereby allowing the management server 110 to take into account other requests, allocations, and QoS of other consumer nodes 120-c within the P2P network.

In S470, it is checked whether additional packets of the video stream are to be received, and if so execution continues with S420; otherwise, execution terminates. It should be noted that execution termination may further include the release of the resource nodes 120-r that provide the packets of the video streams to the consumer node that does not need any additional packets.

In S480, it is checked if redundant video information is received by the consumer node, and if so execution continues with S490; otherwise execution continues with S470. In an embodiment of the invention, the stream may be received as video data or interleaved equations. In the former case, the received video data may be repetition of the same content. Thus, in embodiment of the invention it is checked, in S480, if the number of repetitions is above a predetermined threshold (TH) value. In another embodiment of the invention, where equations are received, equations over a predefined threshold (TH) that do not contribute to the additional detection of video data.

In S490, the number of resource nodes providing video streams to the consumer nodes is reduced. In one embodiment of the invention a predefined number of subtracted resource nodes 120-r is removed from providing video streams to the consumer node. The predefined quota number for reduction may be provided by the management server 110. In another embodiment of the invention a calculation takes place to estimate the number of resource nodes 120-r that is needed to satisfy the QoS conditions for the consumer node and removing a number of resource nodes 120-$r$ that is the difference between the current number of resource nodes used by the consume node and the newly calculated number of resource nodes actually needed to maintain the QoS for the consumer node but with a reduced number of resource nodes. The calculation may be performed by either the consumer node 120-$c$ or by the management server 110 responsive to a request from the consumer node, thereby allowing the management server 110 to take into account other requests, allocations, and QoS of other consumer nodes 120-$c$ within the P2P network. It should be further noted that typically a reduction in the number of resource nodes that provide video streams to a consumer node is done more gradually than the adding of such resource nodes, as it is not desirable to adversely affect the QoS for the consumer node by drastically reducing the number of resource nodes that it uses.

The principles of the invention may be implemented in hardware, firmware, software or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for dynamically adjusting resource nodes supplying time-sensitive content to a consumer node in a real-time peer-to-peer (P2P) network, comprising:
    allocating an initial number of resource nodes of the real-time P2P network to provide the time-sensitive content to the consumer node of the real-time P2P network, each of the allocated resource nodes of the real-time P2P network providing a portion of the time-sensitive content to the consumer node;
    checking if there is a need to receive at least one additional portion of the time-sensitive content from at least one reliable node of the real-time P2P network, and if so, receiving the at least one additional portion of the time-sensitive content from the at least one reliable node of the real-time P2P network;
    requesting an additional number of resource nodes of the real-time P2P network to provide the at least one additional portion of the time-sensitive content when an access to the at least one reliable node of the real-time P2P network occurs more frequently than a first predetermined threshold value, thereby dynamically adjusting the number of resource nodes of the real-time P2P network allocated to the consumer node; and
    reducing the number of resource nodes of the real-time P2P network allocated to provide the at least one additional portion of the time-sensitive content to the consumer node when a number of redundant portions of received portions of the time-sensitive content exceeds a second predefined threshold value.

2. The method of claim 1, wherein reducing the number of resource nodes comprises:
    releasing a predetermined number of resource nodes from supplying the at least one additional portion of the time-sensitive content to the consumer node.

3. The method of claim 2, wherein the predetermined number of resource nodes to be released is set by a management server connected to the real-time P2P network.

4. The method of claim 1, wherein reducing the number of resource nodes further comprises:
    computing a number of resource nodes required to achieve a desired quality of service (QoS) for the consumer node based on the conditions of the real-time P2P network;
    releasing a number of resource nodes equals to a difference between the number of resource nodes actually providing portions of the time-sensitive content to the consumer node and the number of resource nodes required to maintain the desired QoS for the consumer node.

5. The method of claim 4, wherein the number of resource nodes required for achieving a desired QoS is computed by a management server connected to the real-time P2P network.

6. The method of claim 1, wherein the additional number of resource nodes comprises a predetermined number of resource nodes.

7. The method of claim 6, wherein the predetermined number of resource nodes to be added is set by a management server connected to the real-time P2P network.

8. The method of claim 1, further comprises:
    determining the additional number of resource nodes to provide the at least one additional portion of the time sensitive data by:
    computing a number of resource nodes required to achieve a desired quality of service (QoS) for the consumer node based on the conditions of the real-time P2P network;
    setting the additional number of resource nodes to be a difference between the number of resource nodes required to maintain the desired QoS for the consumer node and the number of resource nodes actually providing portions of the time-sensitive content to the consumer node; and
    allocating the additional number of resource nodes to the consumer node.

9. The method of claim 8, wherein the number of resource nodes required for achieving a desired QoS is computed by a management server connected to the real-time P2P network.

10. The method of claim 1, wherein the time-sensitive content includes a video stream.

11. The method of claim 10, wherein the video stream is any one of:
    actual video data and random linear combination equations representative of the video data.

12. A non-transitory computer readable medium having stored thereon instructions for causing one or more processing units to execute the method according to claim 1.

13. A real-time peer-to-peer (P2P) network for delivering time-sensitive content, comprising:
   a plurality of resource nodes for providing at least one portion of the time-sensitive content;
   at least one reliable node for storing therein the time-sensitive content, the at least one reliable node communicatively connected to the plurality of resource nodes;
   at least one consumer node that receives portions of the time-sensitive content from two or more of the plurality of resource nodes initially allocated to provide the portions of the time-sensitive content, the at least one consumer node communicatively coupled to the plurality of resource nodes and the at least one reliable node; and
   a management server for dynamically adjusting the number of resource nodes allocated to the at least one consumer node to provide at least one portion of the time-sensitive content to the at least one consumer node, the management server communicatively connected to the plurality of resource nodes, the at least one reliable node and the at least one consumer node, wherein the management server is configured to dynamically adjust the number of resource nodes by:
      requesting an additional number of resource nodes to provide at least one portion of the time-sensitive content when an access to the at least one reliable node occurs more than a first predetermined threshold value; and
      reducing the number of resource nodes that are allocated to provide the at least one portion of the time-sensitive content to the at least one consumer node when a number of redundant portions of received portions of the time-sensitive content is above a second predefined threshold value.

14. The real-time P2P network of claim 13, wherein the management server is further configured to:
   check if there is a need to receive at least one portion of the time-sensitive content from at least one reliable node of the real-time P2P network; and
   receive the at least one portion of the time-sensitive content from the at least one reliable node when it is needed.

15. The real-time P2P network of claim 14, wherein reducing the number of resource nodes comprises:
   releasing of a predetermined number of resource nodes from providing the at least one portion of the time-sensitive content to the consumer node.

16. The real-time P2P network of claim 15, wherein the management server sets the predetermined number of resource nodes to be released.

17. The real-time P2P network of claim 14, wherein reducing the number of resource nodes further comprises: computing a number of resource nodes required to achieve a desired quality of service (QoS) for the consumer node based on the conditions of the real-time P2P network; and releasing a number of resource nodes equals to a difference between the number of resource nodes actually providing portions of the time-sensitive content to the consumer node and the number of resource nodes required to maintain the desired QoS for the consumer node.

18. The real-time P2P network of claim 14, wherein the management server sets the additional number of resource nodes to be added to a predetermined number.

19. The real-time P2P network of claim 14, wherein the time-sensitive content includes a video stream.

20. The real-time P2P network of claim 19, wherein the video stream is any one of: actual video data and random linear combination equations representative of the video data.

* * * * *